(12) United States Patent
Moore et al.

(10) Patent No.: US 7,596,685 B2
(45) Date of Patent: Sep. 29, 2009

(54) APPARATUS AND METHOD FOR BUILDING, STORING, UPLOADING, RELOCATING AND EXECUTING DOS BASED SOFTWARE MODULE DURING SYSTEM STARTUP TIME

(75) Inventors: Derick G. Moore, Colorado Springs, CO (US); Roy Wade, Colorado Springs, CO (US); Samantha L. Ranaweera, Cranberry Township, PA (US); Lawrence J. Rawe, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 287 days.

(21) Appl. No.: 11/821,622

(22) Filed: Jun. 25, 2007

(65) Prior Publication Data

US 2007/0250698 A1    Oct. 25, 2007

Related U.S. Application Data

(62) Division of application No. 11/011,383, filed on Dec. 14, 2004, now Pat. No. 7,260,713.

(51) Int. Cl.
| G06F 9/00 | (2006.01) |
| G06F 15/177 | (2006.01) |
| G06F 1/24 | (2006.01) |
| G06F 13/00 | (2006.01) |
| G06F 13/14 | (2006.01) |
| G06F 9/44 | (2006.01) |
| G06F 9/445 | (2006.01) |

(52) U.S. Cl. ............................ 713/1; 713/2; 713/100; 710/104; 710/300; 710/305; 717/124; 717/169; 717/175

(58) Field of Classification Search ............... 713/1, 713/2, 100; 710/104, 300, 305; 717/124, 717/169, 175
See application file for complete search history.

(56) References Cited

U.S. PATENT DOCUMENTS

| 6,282,647 | B1 * | 8/2001 | Leung et al. | 713/100 |
| 6,567,911 | B1 * | 5/2003 | Mahmoud | 713/2 |
| 7,007,159 | B2 * | 2/2006 | Wyatt | 713/1 |
| 2005/0132160 | A1 * | 6/2005 | Everett et al. | 711/170 |

* cited by examiner

*Primary Examiner*—Thuan N Du
*Assistant Examiner*—Stefan Stoynov
(74) *Attorney, Agent, or Firm*—Suiter Swantz pc llo

(57) ABSTRACT

The present invention provides a method of packaging, storing, uploading, and executing a DOS based software module capable for being utilized as applications of a PCI device. The present invention may deliver both a binary image and a DOS executable of an application provided by the PCI device. The DOS executable may be utilized by a source level debugger for the development of the application of the PCI device as any changes to the configuration utility can easily be viewed, debugged and corrected. As a result, testing changes become simple operation that does not require building a bundled binary image with the PCI option ROM. The present invention may provide a method for additional modules to be utilized during system startup time. Further, the present invention may provide an independent tool running under DOS without the presence of the PCI option ROM. Independent DOS executable module may be used to demonstrate the application for internal reviews.

13 Claims, 2 Drawing Sheets

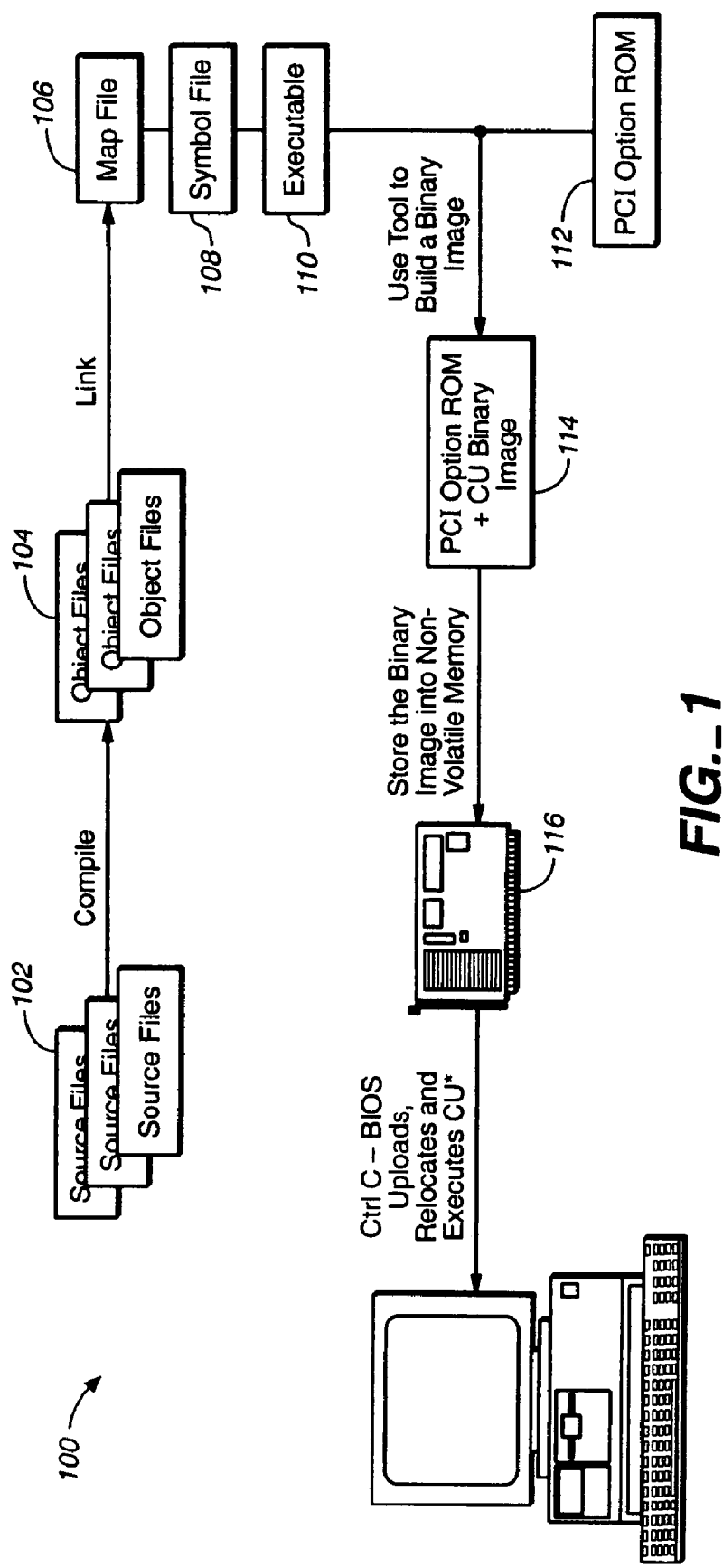
FIG._1

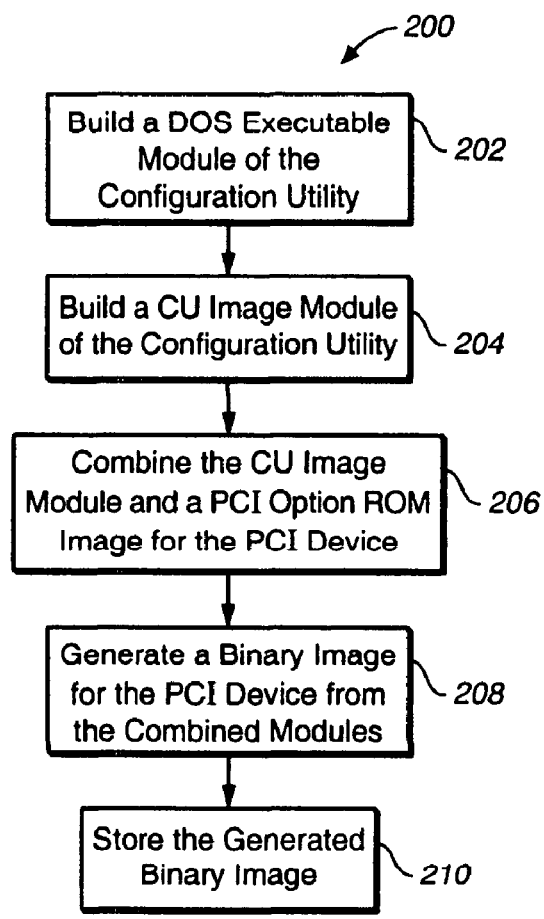
FIG._2
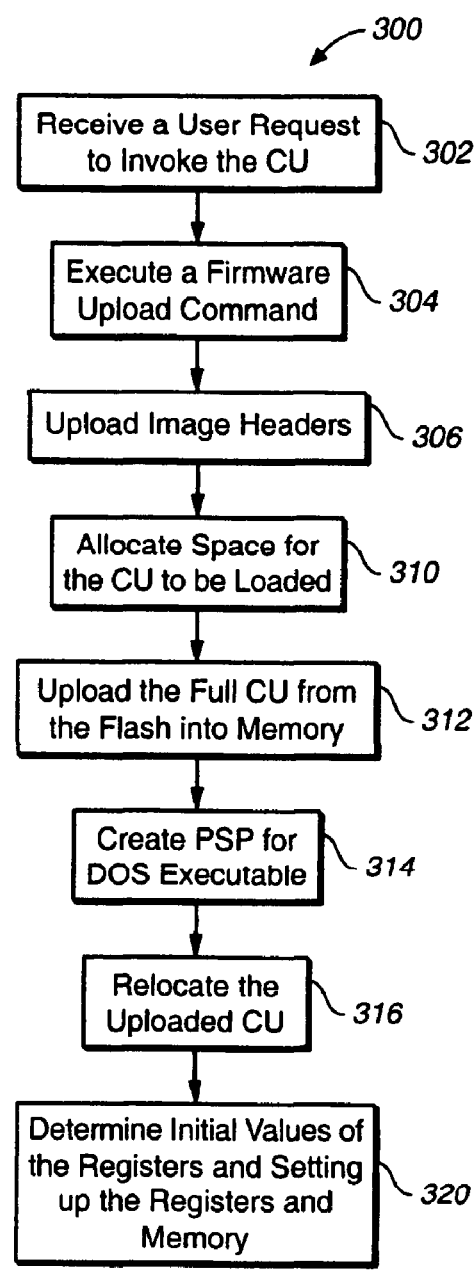
FIG._3

APPARATUS AND METHOD FOR BUILDING, STORING, UPLOADING, RELOCATING AND EXECUTING DOS BASED SOFTWARE MODULE DURING SYSTEM STARTUP TIME

CROSS REFERENCE TO RELATED APPLICATIONS

The present application is a divisional application of U.S. patent application Ser. No. 11/011,383, filed Dec. 14, 2004, now U.S. Pat. No. 7,260,713. Said U.S. patent application Ser. No. 11/011,383 is hereby incorporated by reference in its entirety.

FIELD OF THE INVENTION

The present invention generally relates to the field of computer systems and particularly to DOS based software modules suitable for being loaded and executed during a boot.

BACKGROUND OF THE INVENTION

The system basic input/output system (BIOS) is designed to provide the essential interfacing between hardware and the operating system. In addition, Peripheral Component Interconnect (PCI) Option ROM provides some basic functionality such as PCI device initialization and the provision of INT 13 interface during a boot. PCI is a high-performance, 32-bit or 64-bit bus designed to be used with devices that have high bandwidth requirements, such as display subsystems. Small Computer System Interface (SCSI) is an I/O bus designed as a method for connecting several classes of peripherals to a host system without requiring modifications to generic hardware and software. PCI system interface defines a mechanism that is used to load a PCI option ROM (i.e. BIOS for a PCI device) from a conforming PCI device. The PCI option ROM is stored in a flash memory of the PCI device. Sometimes, the PCI option ROM is stored in the motherboard ROM, a system flash or the like. In most cases, the size of the PCI option ROM is limited to 64K to preserve the option ROM space available in the platforms. Conventionally, the option ROM provides some basic functionality such as device initialization and the provision of INT 13 interface. The PCI option ROM may also provide a configuration utility (CU) including additional functionality such as setting device configuration parameters and diagnostic tests for the PCI device. Many SCSI and Fibre Channel controllers include CUs bundled with the PCI option ROMs. Such CUs may present several problems such as:

1) debugging of the CU is limited to symbolic debugging or extracting debug information through a serial port for the CU. It may become extra overhead on developer resources.

2) any changes to the CU may require a complete build of the PCI option ROM. To test the changes, the new PCI option ROM should be stored and the machine rebooted.

3) the image size of the PCI option ROM includes the code and data space taken by the CU as well. Since the image size is typically limited to 64K, the amount of features that can be added is limited. In order to add new features, some other features had to be taken out. For example, in order to add RAID support, help text describing each selectable field has to be disabled for certain SCSI controllers. Thus, a significant amount of developing time is wasted counting bytes to fit the image size to 64K. Due to the image size limitation, feature addition or refinement to legacy product is near impossible.

4) additional separate modules cannot be introduced since all modules are bundled in a single package.

5) any changes to the PCI option ROM requires a test cycle for the CU and any change to the CU requires a test cycle for the PCI option ROM.

There are various approaches to resolve the above-described problems. Conventionally, a symbolic level debugger has been available to debug the CU in legacy products. However, the level of support provided by a symbolic debugger is very limited compared to a source level debugger. For example, the symbolic debugger does not provide high level of support in terms of line numbers, structure expansion, stack traces, variable look ups or the like. Therefore, debugging a given problem through a symbolic debugger is not as efficient as debugging through a source level debugger. Alternatively, an ICE (In-Circuit Emulator) debugger such as ECM-20 using JTAG port has been used to debug the configuration utility. However, this method requires expensive hardware to set up an ICE debugger or requires a CPU tap. For example, a JTAG chain requires a special port on the system motherboard. Further, setting up the JTAG chain requires some degree of manual intervention which is time consuming. A serial port has also been utilized to debug the configuration utility. However, this method is limited to extracting debug information printed out by the configuration utility. Further, breakpoints cannot be used and no stack traces can be printed. It is impossible to look into random locations in memory through this method.

Conventionally, in a legacy product development, whenever a change is made to the configuration utility, a new PCI option ROM incorporating the change has to be built and stored into a controller before the change can be tested. This approach is also time-consuming. However, there has been no method or system to prevent storing the new PCI option ROM to test changes to the CU in legacy products. It is necessary to store and reboot the target machine to test any changes to the CU.

In order to resolve the limitations of the image size of the PCI option ROM, a method for supporting multi-segment PCI option ROMs has been developed. However, such a method is vendor specific and not common. There is no method or system for introducing additional separate modules to the PCI option ROM. Conventionally, multiple independent functional modules are not supported in legacy BIOS products. Only the CU has been bundled with the PCI option ROM.

Therefore, it would be desirable to provide a method to reduce the burden on the PCI option ROM to piggyback the configuration utility and other applications. It would be also desirable to provide a method to test any changes to the applications without testing the PCI option ROM. It would be also desirable to provide a method to support additional functional modules to be executed during boot time.

SUMMARY OF THE INVENTION

Accordingly, the present invention provides a method of packaging, storing, uploading, and executing a DOS based software module capable of being utilized for a PCI device. The present invention maintains two builds for one of the applications provided by the PCI, which are a DOS executable module and an application binary image module. As a result, testing changes become a simple operation without requiring building a bundled binary image with the PCI option ROM.

In a first aspect of the present invention, a method for packaging and storing one of applications (utilities) of a PCI device is provided. The method may build a DOS executable software module (first software module) of the application and a ROM-able image module (second software module) of the application separately. Then, the second software module and PCI option ROM image may be combined to make a binary image for the PCI device. The generated binary image may be stored into a ROM of the PCI device controller. The PCI option ROM is suitable for being loaded by a system BIOS when the system BIOS detects the presence of the PCI device.

In a second aspect of the present invention, a method for loading, reloading, and executing an application of a PCI device during system startup time is provided. A first software module image and an option ROM BIOS of the PCI may be a firmware image of the PCI device. During a booting up period, a system BIOS may load a PCI option ROM of the PCI device when the system BIOS detects the presence of the PCI device. The PCI option ROM may display a message inquiring a user to press a particular key sequence to invoke the application. If the user desires to invoke the application, a first software module image header and a second software module image header may be loaded from ROM of the PCI device. The BIOS may allocate space for the first software module image to be loaded. Then, the first software module may be uploaded from the ROM into memory. A program segment prefix required by the second software to run may be created. The uploaded first software module image may be relocated through a relocation table present in the second software module image header. Initial values of the registers may be determined and set up.

Advantageously, the present invention provides a convenient development environment such as a source level debugger during initial development, which will minimize development time and constraints on developer resources. A convenient hook up with the PCI option ROM may be provided for release builds. Further, the present invention allows testing changes to become simple operations without building a bundled binary image with the PCI option ROM. The symbols used by two modules do not have to be matched for run time code and initialization code. Since a single relocation table created by a standard DOS compiler and linker combination is utilized for the DOS environment and at system startup time, the build process may be simplified.

The present invention may provide a mechanism for additional modules to be used during system startup time. Further, the present invention may be utilized as an independent tool running under DOS without the presence of the option ROM BIOS. Independent DOS builds were used to demonstrate the application for internal reviews.

The PCI option ROM is relieved from resource limitation issues (such as allocating space for the CU within 64K limit) and related system BIOS issues. Ideally, the PCI option ROM and the application such as CU can be tested independently and versions are controlled independently so as to relieve some of the strain on test lab resources.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of a block diagram of a process in accordance with an exemplary embodiment of the present invention;

FIG. 2 is a flowchart of an exemplary method of packaging and storing a CU in accordance with an exemplary embodiment of the present invention; and FIG. 3 is a flowchart of an exemplary method of uploading and executing the CU in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

The present invention is directed to a method and system of packaging, storing, uploading, and executing DOS based software modules capable for being utilized as applications for a PCI device. A PCI system interface often defines a mechanism that is used to load a PCI option ROM from a conforming PCI device. Conventionally, the PCI option ROM provides some basic functionality such as device initialization and the provision of INT 13 interface. PCI option ROMs may also provide applications including the CU for additional functionality such as setting device configuration parameters and diagnostic tests for the PCI devices. The CU is an example of the applications provided by the PCI option ROMs. The present invention maintains two builds (such as a DOS executable module and an application binary image module) for one of the applications. As a result, testing changes become a simple operation which does not require building a bundled binary image with the PCI option ROM. The present invention may be utilized as a standard method of loading the application for SAS controllers. Further, the present invention may be utilized by SAS controllers, Fibre Channel controllers, or the like. Additionally, the present invention may be used with a modified split option ROM solution for parallel SCSI controllers and other PCI device using a ROM image.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order to prevent any obscurity in the present invention.

Referring generally now to FIGS. 1 through 3, exemplary embodiments of the present invention are shown.

It is to be noted that a Configuration Utility (CU) of a PCI is used for illustrative purpose only. One of ordinary skill in the art will appreciate that a CU is one of various applications provided by a PCI device which may be suitable for being utilized in the present invention.

Referring now to FIG. 1, an exemplary block diagram 100 illustrating a process of building, storing and executing a CU of a PCI device under a system boot environment is shown. In a particular embodiment of the present invention, source files 102 for the CU may be compiled through a compiler capable of generating object files 104 independent from vendor specific library calls or DOS dependant libraries. For example, OPENWATCOM compiler may be utilized to generate object files 104 from source files 102 written by C language. It is to be noted that appropriate compiler flags and memory models are used to support the pre-OS environment running in real mode.

Real mode is a single-tasking execution mode supported by the INTEL™ 80286 and later processors. It is an operating mode of x86 chips that replicates the memory management used by 8086 or 8088 chips, although they run much faster. In real mode, the running program has full access to the computer's memory and peripherals. In real mode, all of the CPU's protection features are disabled, paging is not supported, and program addresses correspond to physical memory addresses. The address space is limited to 1 MB of physical memory and uses a memory segmentation scheme. Other modes which exist are protected mode and virtual mode. The DOS operating system was not designed to take advantage of protected mode, so it always executes programs in real mode unless a protected mode extender is run first. Real mode limits the processor to 1 MB of memory and provides no memory management or memory protection features. The phrase is often used to describe device drivers that operate in this mode. MS-DOS runs in real mode.

The generated object modules may be linked to generate an executable such as a DOS executable module or a ROM-able image module (a CU binary image module) for the configuration utility. In a particular embodiment of the present invention, OPENWATCOM linker may be utilized to link the object modules 104 and generate the DOS executable module. In another particular embodiment of the present invention, OPENWATCOM linker may be utilized to link the object modules 104 and generate the ROM-able image module. It is to be noted that certain compiler flags that enable or disable sections in code may be used in order to generate DOS executable modules and different compiler flags may be used in order to generate ROM-able images. Along with the Executable 110, a Map file 106 and a Symbols file 108 may be generated. The PCI option ROM image and the CU binary image may be combined to generate a binary image 114. It will be appreciated by one of ordinary skill in the art that a firmware image header may be appended and details about the image(s) being stored may be filled. It will be appreciated the generated image may be stored into non-volatile memory such as Read Only Memory (ROM), Erasable Programmable ROM (EPROM), Electronically Erasable Programmable ROM (EEPROM), Flash ROM, Battery Backed RAM, or the like. In a particular embodiment, the generated binary image may be stored into Flash ROM of a controller card of a PCI device. By default, system Basic I/O System (BIOS) will notice the PCI device and load the PCI option ROM of the PCI device.

The system BIOS is a set of routines that works closely with the hardware to support the transfer of information between elements of the system, such as memory, disks, and the monitor. It is well known to the art that the system ROM stores the platform boot, such as BIOS, which is executed upon power-up by the microprocessor to initialize the system, as well as to perform a power-on self-test (POST) and to provide certain low level, hardware dependent support for the display, disk drives, and peripheral devices. More sophisticated routines and data may be included in the system ROM, depending upon the needs and complexity of a given computer system. BIOS code provides the lowest level of interface between the operating system and the hardware.

Referring now to FIG. 2, a flowchart 200 implementing an exemplary method of packaging and storing a CU of a PCI device in accordance with an embodiment of the present invention is shown. Conventionally, a CU of a PCI device is a part of the PCI option ROM. The method may begin with a step in which a DOS executable module of the CU is built in Step 202. It should be appreciated that there are various ways to build the DOS executable module of the CU of the PCI device. Along with the DOS executable module, a Map file and a Symbols file may be generated. In step 204, a CU image module of the CU (a ROM-able image of the configuration utility) may be generated. Then, the CU image module and a PCI option ROM image may be combined in step 206. A binary image for the PCI device may be generated from the combined modules in Step 208. The generated binary image may be stored into a controller card of the PCI device. It is well known to the art that the PCI option ROM is suitable for being loaded by a system BIOS when the system BIOS detects presence of the PCI device. In a particular embodiment, during a system startup time, a system BIOS may load a PCI option ROM of the PCI device when the system BIOS detects presence of the PCI device. The PCI option ROM may display a message in order to receive a request from a user to invoke the CU. In a particular embodiment, the message may be displayed to request the user to press a particular key combination, such as CTRL and C, to invoke the CU. If the PCI option ROM detects this key sequence, the CU may be loaded, reloaded and executed in accordance with the present invention.

Referring now to FIG. 3, a flowchart 300 implementing an exemplary method of loading, reloading and executing a CU of a PCI device in accordance with an embodiment of the present invention is shown. When the PCI option ROM receives a user request to invoke the CU in Step 302, the PCI option ROM may execute a firmware upload command in Step 304. A DOS executable image header and a CU firmware image header may be uploaded to memory such as Random Access Memory (RAM) of the system in Step 306. For example, the PCI option ROM may execute a Fusion MPT™ firmware upload command to upload the CU firmware image header and the DOS executable image header. Using these two image headers, the BIOS code may determine the size of the memory required to upload the CU. This includes the memory for code segment and the minimum and maximum memory required for the data segment. In Step 310, the PCI option ROM may allocate space for the CU image module to be uploaded. In a particular embodiment, the PCI option ROM uses a certain Post Memory Manager (such as PMM 1.01) or a BIOS defined mechanism to locate free space in conventional memory. The full CU may be uploaded (decompressed) from the ROM into memory such as RAM or the like in Step 312.

Once the CU image is in memory, the Program Segment Prefix (PSP) may be created in Step 314. The PSP is required by the DOS executables of the CU (The DOS loader may create the PSP when the CU is run under DOS environment). Additionally, a field describing the maximum number of free paragraphs may be determined, which the CU includes at its disposal to create a heap. Conventionally, the CU memory management routines utilize the heap internally. In a particular embodiment, the PSP is a 256 byte segment and resides directly before the start of the DOS executable header.

In Step 316, the PCI option ROM may relocate the CU image uploaded previously. In such a case, the PCI option ROM may use a relocation table present in the DOS executable header to determine which location needs patching. In Step 320, the system BIOS uses the DOS executable header to determine the initial values of registers in the processors. An example of the processors may include INTEL® X86 based processors. In a particular embodiment of the present invention, the values of registers may include the following:

ES and DS segment registers may both point to the base of the PSP segment. The system BIOS knows the location where it created the PSP.

SS/SP may be filled with initial values present in the DOS executable header, which were populated by the linker.

AX/BX/CX/DX/SI/DI may be cleared to zero. BP may be set to SP.

CS:IP may be set to the initial execution point contained in the DOS executable header. Loading these two registers will cause execution to jump to the startup code of the CU. At this point, execution will be transferred form the BIOS to the CU.

The CU startup code further sets up the registers and memory and then the main function of the CU may be called. The systems BIOS may additionally provide a list of adapters present in the system to the CU to manage and an interface pointer which will provide certain services such as memory allocation or the like. Alternatively, the CU may do the enumeration.

The present invention may deliver an application binary image module or a DOS executable module for an application of a PCI device. The DOS executable module may be utilized by a source level debugger since any changes to the application may be easily viewed, debugged and corrected. It is to be noted that there is a debug tool designed to test the upload, relocation and the transfer of the execution of the application under DOS environment. Such a tool may enable the DOS executable module of the present invention as a source level debugger. In an advantageous aspect of the present invention, the DOS executable can be distributed to customers without a complete turnaround of the BIOS, if the changes required are limited to the application alone. The DOS executable module may serve as a good demonstration vehicle for the application of the PCI device. To isolate system dependent functionality, a platform dependent layer has been defined. It is called the PAL layer or the Platform Abstraction Layer. For example, in order to port the application to another system such as the EFI environment, only the platform layer needs to be changed, which makes porting an easier task. Further, the present invention may provide a method to enable additional modules to be stored and uploaded if necessary. For example, a diagnostic module separate from the PCI option ROM and the CU be stored and uploaded in accordance with the present invention.

In another advantageous aspect of the present invention, the symbols used by two modules (a DOS executable and an application binary image) do not have to be matched for run time code and initialization code. Since a single relocation table created by a standard DOS compiler and linker combination is utilized for the DOS environment and at system startup time, the build process may be simplified. The method of the present invention may be utilized for packaging, uploading and relocating additional modules used during system startup time.

Additionally, the present invention may be utilized as an independent tool running under DOS without the presence of the PCI option ROM. As such, independent DOS builds may be used to demonstrate the application for internal reviews. It may be circulated to a limited set of customers for their input. An independent DOS build may be utilized as a good demonstration vehicle of the application. Further, the present invention may allow the PCI option ROM to be relieved from resource limitation issues (such as allocating space for the CU within 64K limit) and related system BIOS issues. The PCI option ROM and the application may be tested independently and version of them controlled independently.

The present invention may be used with any PCI device using a ROM image including, but is not limited to, Fibre channel controllers, SCSI controllers or the like. Further, the present invention may assist in building a single PCI option ROM that can control SAS, SCSI, Fibre channel controllers or the like. Controller dependent configuration utilities may be loaded directly from the controller being configured.

It is to be noted that the present invention may provide a convenient development environment during initial development, which will help to minimize development time and constraints on developer resources, and provide a convenient hook up with the PCI option ROM for release builds. Further, the present invention may allow testing changes to become simple operations that do not require building a bundled binary image with the PCI option ROM. The present invention may provide startup time diagnostic modules that can be invoked through the PCI option ROM. The application may be made into a separate independent DOS based product with little additional development time. The present invention may also provide a method to distribute additional operating system dependent modules in binary for transfer ROM, allowing a standalone machine to use self-contained controllers that requires little or no manual intervention.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for loading, reloading and executing a plurality of software modules of an application of a PCI device during system startup time, comprising:
    uploading image headers from non-volatile memory of the PCI device;
    allocating space for a first software module to be loaded;
    uploading the first software module from the non-volatile memory into system memory;
    relocating the uploaded first software module,
    wherein a relocation table is utilized; and
    determining initial values of registers and setting up the registers and the system memory,
    wherein the plurality of software modules include the first software module and a second software module, and the first software module and a PCI option ROM BIOS of the PCI are a firmware image of the PCI device; and
    wherein the first software module is an application firmware image, and the second software module is a DOS executable image.

2. The method as described in claim 1, further comprising:
    creating a program segment prefix,
    wherein the program segment prefix is required by the second software module to run.

3. The method as described in claim 1, further comprising:
    receiving a user selection to invoke the application.

4. The method as descried in claim 3, further comprising:
displaying a message to receive the user selection when a system BIOS loads a PCI option ROM of the PCI device.

5. The method as described in claim 4, wherein the user selection is a key sequence.

6. The method as described in claim 1, wherein the relocation table is included in a second software module header.

7. The method as described in claim 1, further comprising:
providing a list of adapters in order for the application to manage.

8. The method as described in claim 1, wherein the non-volatile memory is flash ROM of the PCI device controller.

9. A system for loading, reloading and executing a configuration utility of a PCI device during system startup time, comprising:
means for receiving a user request to invoke the configuration utility;
means for executing a firmware upload command to upload a DOS executable header and a configuration utility firmware header from non-volatile memory,
wherein a DOS executable header and a configuration utility firmware header are uploaded into system memory;
means for allocating space for a configuration utility firmware to be loaded;
means for uploading the configuration utility firmware from the non-volatile memory into system memory;
means for creating a program segment prefix,
wherein the program segment prefix is required by a DOS executable to run;
means for relocating the uploaded configuration utility,
wherein a relocation table present in the DOS executable header is utilized;
means for determining initial values of the registers; and
setting up the registers and the system memory,
wherein a DOS executable image is loaded to be the DOS executable, a configuration utility firmware image is loaded to be the configuration utility firmware, and the DOS executable image, the configuration utility firmware image, and a PCI option ROM BIOS of the PCI have been stored on the PCI device.

10. The system as described in claim 9, further comprising:
displaying a message to ask the user selection when a system BIOS loads a PCI option ROM of the PCI device.

11. The system as described in claim 10, wherein the user selection is a key sequence.

12. The system as described in claim 9, further comprising:
means for providing a list of adapters in order for configuration utility to manage.

13. The system as described in claim 9, wherein the non-volatile memory includes Flash ROM, EEPROM, EPROM and battery backed RAM.

* * * * *